United States Patent [19]

Barton et al.

[11] 3,927,013

[45] Dec. 16, 1975

[54] CERTAIN 4,7-DIAZA-6-OXO-2-THIABICYCLO[3,2,0]HEPT-3-ENES

[75] Inventors: Derek Harold Richard Barton, London; William George Elphinstone Underwood, Stoke Poges; Brian Edgar Looker, Greenford; Graham Hewitt, Northolt, all of England

[73] Assignee: Glaxo Laboratories Limited, Greenford, England

[22] Filed: July 30, 1971

[21] Appl. No.: 167,849

[30] Foreign Application Priority Data
Nov. 3, 1970  United Kingdom............... 52290/70

[52] U.S. Cl.... 260/306.7 C; 260/239 A; 260/239.1; 260/243 C; 260/294.8 C
[51] Int. Cl.$^2$........................................ C07D 513/04
[58] Field of Search.... 260/306.7, 306.7 C, 294.8 C

[56] References Cited

UNITED STATES PATENTS

| | | | |
|---|---|---|---|
| 3,594,389 | 7/1971 | Cooper............................. | 260/306.7 |
| 3,681,380 | 8/1972 | Cooper et al..................... | 260/306.7 |
| 3,799,938 | 3/1974 | Hgusler et al................ | 260/306.7 C |

*Primary Examiner*—R. Gallagher
*Attorney, Agent, or Firm*—Bacon & Thomas

[57] ABSTRACT

A process as provided for the production of new $\beta$-lactams of use in the production of penicillin, cephalosporins and related $\beta$-lactam antibiotics, whereby a grouping is attached to the $\beta$-lactam nitrogen which is ultimately capable of cyclisation with a sulphur atom at the adjacent carbon atom of the $\beta$-lactam ring. The starting materials for the process can themselves be obtained from penicillins produced by fermentation without loss of the desired configuration of the $\beta$-lactam ring.

11 Claims, No Drawings

CERTAIN 4,7-DIAZA-6-OXO-2-THIABICYCLO[3,2,0]HEPT-3-ENES

This invention relates to novel semisynthetic intermediates or relay compounds of use in the production of cephalosporins, penicillins and related β-lactam antibiotic compounds.

The first total synthesis of a cephalosporin antibiotic was achieved by R. B. Woodward (J.A.C.S. 1966, 88, (4),852) starting from L(+)-cysteine and proceeding via about eight synthetic steps to a β-lactam (i) which was then converted into a cephem (iii) by the following reaction sequence:

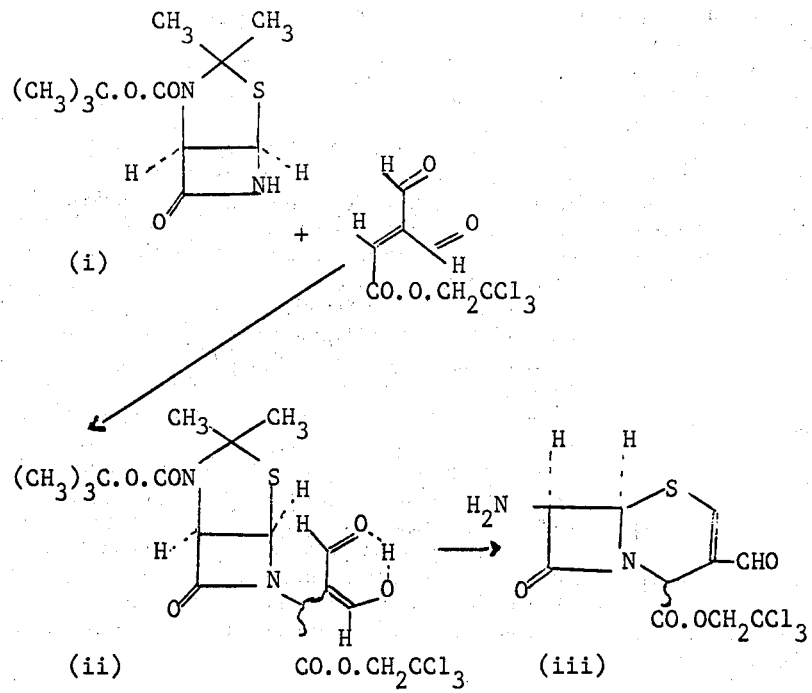

The compound (i) thus constitutes a valuable intermediate in the preparation of cephalosporins and other β-lactam antibiotics; by reaction with an analogous aldehyde reagent it is also possible to convert (i) in a penicillin and it will be appreciated that in this way penicillins having varying substitution in the 5-membered ring can be produced. Similarly by replacing the 2,2,2-trichloroethyl 3,3-diformylacrylate reagent by suitably substituted alternatives, a series of cephalosporin analogues can be prepared.

R. B. Woodward started from L(+)-cysteine in order to achieve a total synthesis. However, this material is relatively expensive and even more significantly, its conversion into a β-lactam of the required stereochemical configuration requires extremely careful control of the stereochemistry at several points. We have now found that intermediates closely similar to Woodward's compound (i) can be produced from penicillins; this conversion proceeds more readily and in fewer stages than the production of (i) from L-(+)-cysteine and has the merit of starting from a β-lactam of the required steric configuration. Furthermore, penicillins, particularly penicillins G and V, are generally cheaper to produce, e.g. by fermentation, than L(+)-cysteine.

In the Application of even data herewith of D. H. R. Barton, A. G. Long, B. E. Looker, E. M. Wilson and W. E. Underwood Ser. No. 167,876, filed July 30, 1971, the Application of even data herewith of W. E. Underwood and G. Hewitt Ser. No. 167,847, filed July 30, 1971 refiled as Continuation Application Ser. No. 448,624 on Mar. 6, 1974, the Application of even data herewith of D. H. R. Barton, M. V. Taylor, W. E. Underwood, B. E. Looker and G. Hewitt, Ser. No. 167,848, filed July 30, 1971 and the Application of even data herewith of D. H. R. Barton, P. G. Sammes, B. E. Looker, G. Hewitt and W. E. Underwood, Ser. No. 167,875 filed July 30, 1971, refiled as Divisional Applications Ser. Nos. 389,671 and 389,663 on Aug. 20, 1973, there is described the production from penicillins of compounds which can be represented by the formula:

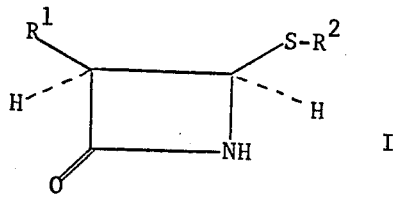

where R is an amino group or a blocked amino group, including in particular groups NH.COR which are sidechains present in the 6-position in penicillins; and $R^2$ is an acyl group (including a sulphonyl, sulphinyl or phosphoryl group), an aliphatic, araliphatic or aromatic group or a group —S—$R^3$, where $R^3$ is the residue of a thiophilic sulphur nucleophile or a group of the formula

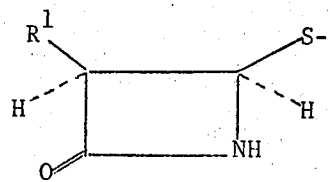

or $R^1$ and $R^2$ together with the sulphur atom form a group

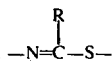

The compounds of formula I possess the β-lactam ring structure of the penicillins from which they were derived, with the same steric configuration. They are thus very suitable intermediates for the production of further penams and the related cephams which have this β-lactam structure in common whereas the synthesis of Woodward required very careful control to achieve a suitable β-lactam configuration.

The compounds of formula I may be reacted with reactive esters of alcohols or phenols, with acylating agents or with aliphatic or araliphatic compounds containing an electrophilic multiple carbon-carbon bond in the presence of a base able to deprotonate the β-lactam nitrogen, to yield compounds of the formula:

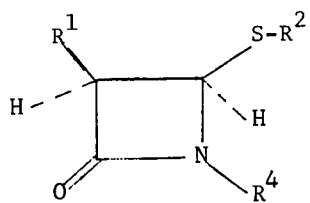

II where $R^4$ is an aliphatic, aromatic or araliphatic group or an acyl group and $R^1$ and $R^2$ have the above meanings.

The reactive ester or acylating agent may be represented by the formula $R^4X$ where X is a reactive ester substituent such as a halogen atom, e.g. a chlorine, bromine or iodine atom; an aliphatic or aromatic sulphonyloxy group, for example a mesyloxy or tosyloxy group; or, where $R^4$ is an acyl group, an acyloxy group as in an anhydride.

Suitable reagents of the formula $R^4X$ thus include α-haloesters such as bromomalonic acid esters, α-bromobutyrolactone, α-bromo-α-benzoylacetic acid esters and 2,4-dibromo-butyric acid esters; alkyl halides and alkenyl halides such as allyl bromide having up to 6 carbon atoms; and α-haloketones such as α-bromoacetone or phenacyl halides.

The aliphatic or araliphatic compound containing an electrophilic multiple carbon-carbon bond may be represented by the formula

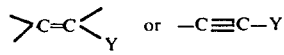

where Y is an electron attracting group such as an esterified carboxyl, acyl, cyano or sulphonyl group. Suitable reagents include, for example, α-haloacrylic esters such as α-bromo-acrylic esters, e.g. the methyl, benzyl and p-nitrobenzyl esters; acrylonitrile and acetylene dicarboxylic esters.

The reaction is preferably effected in an inert solvent, which is preferably polar and may, for example be a ketone, e.g. acetone or methyl ethyl ketone; a cyclic ether such as dioxan or tetrahydrofuran; or an amide, or imide solvent such as dimethylformamide or dimethylacetamide.

The base may, for example, be an alkali metal carbonate e.g. sodium or potassium carbonate, in which case the solvent advantageously contains some water; or an alkali metal hydride amide or silylamide, e.g. sodium or potassium hexamethyldisilazanyl.

Where $R^1$ is a protected amino group, this may be conveniently one of the groups set out in the following table

| Type | Example | Usual Name and Analogues etc. |
|---|---|---|
| Urethane | HNCOCH$_2$Ph ‖ O | Benzyloxycarbonyl, p-Methoxy |
| Urethane | HNCOC(CH$_3$)$_3$ ‖ O | t-Butoxycarbonyl |
| Urethane | HNCOCHPh$_2$ ‖ O | Diphenylmethoxycarbonyl |
| Urethane | HNCO—(1-adamantyl) ‖ O | 1-Adamantyloxycarbonyl |
| Arylmethylamino | HNCPh$_3$ | Trityl |
| Onium | $\overset{+}{NH_3}$ | |
| Urethane | HN.CO.OCH$_2$CCl$_3$ | β, β, β-trichloroethoxycarbonyl |

Where $R^1$ is a group NHCOR, R can be defined generally as hydrogen or an organic group which preferably contains 1–20 carbon atoms.

In general, the following main classes are especially suitable for the acyl group RCO—:

i. $R^uC_nH_{2n}$—CO where $R^u$ is aryl (carbocyclic or heterocyclic), cycloalkyl, substituted aryl, substituted cycloalkyl, cyclohexadienyl, or a nonaromatic or mesoionic heterocyclic group, and $n$ is an integer from 1–4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl)aminophenylpropionyl; thienyl-2-and-3-acetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halophenyl e.g. chloro- or bromo-phenyl. An acyl group of this type is 3-o-chlorophenyl-5-methylisoxazol-4-yl-acetyl.

ii. $C_nH_{2n+1}$CO— where $n$ is an integer from 1–7. The alkyl group may be straight or branched and, if desired, may be interrupted by an oxygen or sulphur atom or substituted by e.g. one or more halogen atoms, a cyano group, a carboxy group, an alkoxycarbonyl group, a hydroxy group or a carboxycarbonyl group (—CO.-COOH). Examples of such groups include cyanoacetyl, hexanoyl, heptanoyl, octanoyl, butylthioacetyl, chloroacetyl and trichloroacetyl groups.

iii. $C_nH_{2n-1}$CO— where $n$ is an integer from 2–7. The alkenyl group may be straight or branched and, if desired, may be interrupted by an oxygen or a sulphur atom. An example of such a group is allylthioacetyl.

iv.

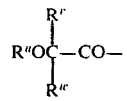

where $R^u$ has the meaning defined under (i) and in addition may be benzyl, and $R^r$ and $R^{rr}$ which may be the same of different each represent hydrogen, phenyl, benzyl, phenethyl or lower alkyl. Examples of such groups include phenoxyacetyl, 2-phenoxy-2-phenylacetyl, 2-phenoxypropionyl, 2-phenoxybutyryl, 2-methyl-2-phenoxypropionyl, p-cresoxyacetyl and p-methylthiophenoxyacetyl.

v.

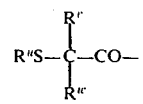

where $R^u$ has the meaning defined under (i), and, in addition, may be benzyl and $R^r$ and $R^{rr}$ have the meanings defined under (iv). Examples of such groups include S-phenylthioacetyl, S-chlorophenylthioacetyl, S-fluorophenylthioacetyl, pyridylthioacetyl, and S-benzylthioacetyl.

vi. $R^uZ(CH_2)_m$CO— where $R^u$ has the meaning defined under (i) and, in addition, may be benzyl, Z is an oxygen or sulphur atom and m is an integer from 2–5. An example of such a group is S-benzylthiopropionyl.

vii. $R^u$CO— where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substitutes for benzoyl include alkyl, alkoxy, phenyl, phenyl substituted by carboxy, alkylamido, cycloalkylamido, allylamido, phenyl(lower)alkyl amido, morpholinocarbonyl, pyrrolidinocarbonyl, piperidinocarbonyl, tetrahydropyridino, furfurylamido or N-alkyl-N-anilino, or derivatives thereof and such substituents may be in the 2- or 2- and 6-positions. Examples of such substituted benzoyl groups are 2,6-dimethoxybenzoyl, 2-methylamidobenzoyl and 2-carboxybenzoyl. Where the group $R_u$ represents a substituted 4-isoxazolyl group, the substituents may be as set out above under (i). Examples of such 4-isoxazolyl groups are 3-phenyl-5-methyl-isoxazol-4-yl carbonyl, 3-o-chlorophenyl-5-methyl isoxazol-4-yl carbonyl and 3-(2,6-dichlorophenyl)-5-methyl-isoxazol-4-yl carbonyl.

viii.

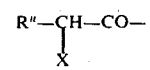

where $R^u$ has the meaning defined under (i) and X is amino, substituted amino (e.g. acylamido or a group obtained by reacting the α-aminoacylamido group of the 6-side chain with an aldehyde or ketone e.g. acetone, methylethylketone or ethyl acetoacetate), hydroxy, carboxy, esterified carboxy, triazolyl, tetrazolyl, cyano, halogeno, acyloxy (e.g. formyloxy or lower alkanoyloxy) or etherified hydroxy group. Examples of such acyl groups are α-aminophenylacetyl and α-carboxyphenylacetyl.

ix.

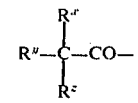

where $R^x$, $R^y$ and $R^z$ which may be the same or different may each represent lower alkyl, phenyl or substituted phenyl. $R^x$ can also be hydrogen. An example of such an acyl group is triphenylmethylcarbonyl.

x.

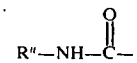

where $R^u$ has the meaning defined under (i) and in addition may be hydrogen, lower alkyl or halogen substituted lower alkyl. An example of such a group is $Cl(CH_2)_2NHCO$.

xi.

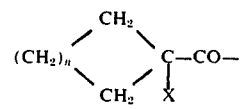

where X has the meaning defined under (viii) above and n is an integer of from 1 to 4. An example of such an acyl group is 1-aminocyclohexanecarbonyl.

xii. Amino acyl, for example R'''CH(NH$_2$).(CH$_2$)$_n$CO, where n is an integer from 1–10, or NH$_2$.C$_n$H$_{2n}$Ar(CH$_2$)$_m$CO, where m is zero or an integer from 1–10, and n is 0, or 2, R''' is a hydrogen atom or an alkyl, aralkyl, or carboxy group or a group as defined under R'' above, and Ar is an arylene group, e.g. p-phenylene or 1,4-naphthylene. Examples of such groups are disclosed in British Patent Specification No. 1,054,806. A group of this type is the p-aminophenylacetyl group. Other acyl groups of this type include those, e.g.δ-aminoadipoyl, derived from naturally occurring amino acids and derivatives thereof e.g. N-benzoyl-δ-aminoadipoyl or N-chloroacetyl-δ-aminoadipoyl.

xiii. Substituted glyoxylyl groups of the formula R$^y$.-CO.CO— where R$^y$ is an aliphatic, araliphatic or aromatic group, e.g. a thienyl group, a phenyl group, or a mono-, di- or tri- substituted phenyl group, the substituents being, for example, one or more halogen atoms (F, Cl, Br or I), methoxy groups, methyl groups or amino groups, or a fused benzene ring. Included in this group are also the α-carbonyl derivatives of the above substituted glyoxylyl groups, formed for example with hydroxylamino, semicarbazide, thiosemicarbazide, isoniazide or hydrazine.

Preferred amino protecting groups are the hydrocarbyloxycarbonyl groups (wherein the amino group forms part of a urethane), in particular alkoxycarbonyl groups such as methoxycarbonyl, ethoxycarbonyl and, most preferably t-butoxycarbonyl groups, which may carry substituents such as halogen atoms as in the 2,2,2-trichloroethoxycarbonyl group, as well as aralkoxycarbonyl groups such as benzyloxycarbonyl, p-methoxybenzyloxycarbonyl and diphenylmethoxycarbonyl groups. Cycloalkoxycarbonyl groups are also advantageous, especially the adamantyloxycarbonyl group. The p-nitrobenzyloxycarbonyl group, which can be selectively removed by reduction e.g. hydrogenolysis, is also useful. The initial penicillins carrying protecting groups of this type may be prepared from 6-aminopenams by conventional methods for example by reaction with an appropriate haloformic ester.

R$^2$, when an an acyl group, may be an aliphatic, araliphatic or aromatic acyl group, preferably having 1–20 carbon atoms, e.g. a lower (C$_{1-5}$) aliphatic acyl group such as an acetyl or propionyl group; a monocyclic aralkanoyl group, preferably having 1–6 carbon atoms in the alkyl portion, e.g. a phenacetyl or phenylpropionyl group; or a monocyclic aroyl group, e.g. a benzoyl or toluoyl group.

Where R$^2$ is an aliphatic, araliphatic or aromatic group, this also preferably contains 1–20 carbon atoms, for example an alkyl group (e.g. C$_{1-5}$) such as a methyl, ethyl or butyl group; an aralkyl group, preferably a mono-cyclic aralkyl group having 1–5 carbon atoms in the alkyl portion, e.g. benzyl, phenylethyl or triphenylmethyl group; or a monocyclic aryl group such as a phenyl or tolyl group.

Where R$^2$ is —SR$^3$, R$^3$ may, for example be one of the aliphatic, araliphatic or aromatic groups described for R$^2$.

R$^4$ may be an acyl group or an aliphatic, araliphatic or aromatic group, for example as particularly described for R$^2$. However, in order to facilitate subsequent cyclisation with the sulphur atom to form a polycyclic structure such as a penam, cepham or cephem structure, R$^4$ preferably carries a functional group, for example a group X as defined above and/or an esterified carboxyl group, advantageously on the β- or γ-carbon atoms. Thus, for example R$^4$ may be an alkyl or alkenyl group having up to 6 carbon atoms, such as a methyl or, ethyl, a monocyclic aralkyl group having 1–6 carbon atoms in the alkyl portion or a monocyclic aryl group, or an esterified carboxymethyl, 2-oxo-propyl, diesterified dicarboxymethyl, α (or β)-bromo-α (or β)- alkoxycarbonyl-ethyl group or a α (or β)-bromo-α (or β)- p-nitrobenzyloxycarbonylethyl group.

Those compounds in which R$^4$ already carries a functional group capable of reaction with the sulphur atom, on cleavage as described in the copending application of even date herewith of D. H. R. Barton, P. G. Sammes, G. Hewitt, B. E. Looker and W. E. Underwood Ser. No. 167,875 filed July 30, 1971 refiled as Divisional Applications Ser. Nos. 389,671 and 389,663 on Aug. 20, 1973, can form bicyclic structures, for example, of the penam, cepham or cephem type and can readily then be converted either into active antibiotics of known activity obtained previously by more difficult syntheses or into new active antibiotics.

Thus, for example, if R$^4$ represents an esterified 2-bromo-2-carboxyethyl group and R$^2$ represents a group SR$^3$ or forms with R$^1$ together with the sulphur atom a grouping

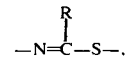

cleavage yields an esterified 2-carboxypenam, which on deesterification yields the corresponding acid. This reaction is described in the copending application of D. H. R. Barton, P. G. Sammes, G. Hewitt, B. E. Looker and W. E. Underwood referred to above. Such compounds are active antibiotics and, for example, the compound in which R$^1$ is the phenylacetamido group has shown pronounced antibacterial activity.

However, it is not necessary that R$^4$ possesses a functional group capable of reaction at the sulphur atom since such a functional group may be introduced subsequently for example by conventional functionalisation techniques such as bromination, or existing functional groups which are not suitable for reaction at the S-atom may subsequently be modified. Additionally, the S-atom may carry a suitable substituent, that is a group R$^2$, carrying an appropriate active function to react subsequently with R$^4$ to form a bicyclic structure.

According to a modification of the invention a compound of the formula I in which R$^1$ and R$^2$, together with the sulphur atom, represent a group —NH—CH(-R)—S—, may be reacted with a reactive ester of an alcohol or phenol, with an acylating agent or with an aliphatic or araliphatic compound containing an electrophilic multiple carbon-carbon bond in the presence of a base able to deprotonate the β-lactam nitrogen, to yield thiazolidines the formula II in which R$^1$ and R$^2$, together with the sulphur atom, form a group R, NH—CH(R)—S—.

The starting materials of the formula I in this modified reaction can be prepared by the method described in the copending application at even date herewith of W. E. Underwood and A. G. Long corresponding to our application Ser. No. 167,874, filed July 30, 1971.

The thiazolines and thiazolidines of formula II are new compounds constituting a further feature of the invention with the exception of those in which R⁴ is a group having the structure —CH(R⁵)—C(CH₃)=CH₂ or —CH(R⁵)=C(CH₃)₂ wherein R⁵ is a hydroxymethyl, an esterified or etherified hydroxymethyl, a carboxyl group, a carboxyamide group or an esterified carboxyl group.

Further compounds according to the invention include compounds of formula II in which R¹ is an amino or blocked amino group, R² is an acyl group or an aliphatic, araliphatic or aromatic group or a group —SR³ as defined above and R⁴ is an esterified α-carboxyalkyl group carrying in addition in the α-position an acyl, esterified carboxyl or cyclopropyl substituent.

EXAMPLE 1

Methyl 3-[(3′R,4′R)-4′-(2″-methylpropyldithio)-3′-phenylacet-amidoazetidin-2′-on-1′-yl]-2-bromopropionate (3R,4R)-4-(2′-Methylpropyldithio)3-3phenylacetamidoazetidin-2-one (0.323 g. 0.001 mole) and sodium carbonate (0.5 g., 0.0047 mole) were stirred in acetone (4 ml.) containing water (1 ml.) at 20° while methyl 2,3-dibromopropionate (0.4 ml.) in acetone (2 ml.) was added over 1 hour. After a further 5 hours, the mixture was evaporated to remove the acetone and the residue extracted with ethyl acetate (2 × 50 ml.). The combined organic solutions were washed with water (2 × 30 ml.) and evaporated to give an oil. This was chromatographed on silica gel; elution with ethyl acetate:petrol (bp. 60°–80°) = 1:1 gave methyl (3R,4R)-2[4′-(2″-methylpropyldithio)-3′-phenylacetamidoazetidin-2′-on-1′-yl]-3-bromopropionate (51 mg. 10%), ν$_{max}$ (CHBr₃) 3390 (NH), 1760 (β-lactam) 1734 (ester), and 1678 and 1518 cm⁻¹ (COWH), NMR (CDCl₃ τ) (mixture of diastereoisomers)2.68 (singlet; phenyl protons), 3.56 (doublet, J 9Hz; CONH), 4.44 and 4.48 (double doublets, J 9,4 Hz; C—3H), 4.91 and 5.04 (doublets, J 4Hz; C—4H), 5.47 (multiplet; >NCH<) 6.20 (singlet; COOCH₃), 6.2 to 6.4 (multiplet; —CH₂Br), 6.39 (singlet; PhCH₂) 7.46 (doublet, J 7 Hz; —S—CH₂), 8.16 [multiplet; —CH(CH₃)₂], and 9.04 [doublet, J 7 Hz; (CH₃)₂].

EXAMPLE 2 p-Nitrobenzyl 3-[(3′R,4′R)-4′-(2″-methylpropyldithio)-3′-phenylacetamidoazetidin-2′-on-1′-yl]-2-bromopropionate A solution of (3R,4R)-2-methylpropyldithio)-3-phenyl-acetamidoazetidin-2-one (0.5 g, 1.54 m.mole) in acetone (15 ml.) containing anhydrous potassium carbonate (ca 3 g.) and -p nitrobenzyl 2-bromoacrylate (0.44 g. 1 equiv.), was stirred at 22° for 16 hours. The reaction mixture was filtered over kieselguhr and the filtrate evaporated to a foam. This was chromatographed on silica (10 g.) with benzene;ethyl acetate = 4:1 as solvent to give the title compound (0.4 g., 42.5%), R$_f$0.48 (benzene:ethylacetate = 1:1) IR(CHBr₃) 3426 (NH), 1755 (β-lactam), 1735 (CO₂R), 1670 and 1500 (CONH), 1516 and 1344 cm⁻¹ (—NO₂), NMR (CDCl₃τ), 1.75 and 2.45 (AB-quartet, J 9Hz),

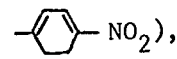

2.65 (phenyl), 3.72 (NH), 4.5 and 5.0 (6-H and 5-H respectively, multiplet, J 4Hz),

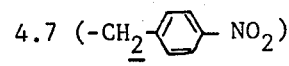

5.4 to 6.0 (multiplet —CH₂—CH—), 6.4 (—CH₂phenyl), 7.48 (doublet, S—CH₂), 8.2 (multiplet —CH) 9.0 and 9.06 ((CH₃)₂).

EXAMPLE 3

(1R,5R)-3-Benzyl-4,7-diaza-7-ethyl-6-oxo-2-thia-bicyclo[3,2,0]-hept-3-ene

Ethyl bromide (0.2 ml.) was added to (1R,5R) 3-benzyl-4,7-diaza-6-oxo-2-thia-bicyclo[3,2,0]-hept-3-ene (218 mg., 0.001 mole) and sodium mexamethyldisilazane (183 mg. 0.001 mole) in N,N-dimethylformamide (2 ml.) stirred at 20°. After 15 minutes, the mixture was partitioned between ethyl acetate (100 ml.) and water (50 ml.) The aqueous layer was extracted with further ethyl acetate (50 ml.) and the combined organic layers were washed with water (3 × 50 ml.). The ethyl acetate was evaporated to give crude product (238 mg., 92%). This was chromatographed on silica gel; elution with ethyl acetate:petrol (b.p. 60°–80°)=2:1 gave (1R,5R)-b 3-benzyl-4,7-diaza-7-ethyl-6-oxo-2-thia bicyclo[3,2,0]-hept-3-ene (189 mg., 73%), [α]$_D^{20}$ −36° (c 1.00, dioxan), m.p. 71°, ν$_{max}$(CHBr₃) 1760 (β-lactam) and 1616 cm⁻¹ (C=N), NMR (CDCl₃, τ) 2.70 (singlet; phenyl proton), 4.08 and 4.52 (two doublets, J 4Hz; 1-H and 5-H), 6.03 and 6.22 (AB-quartet J 16Hz; PhCH₂—), 6.72 (multiplet; —CH₂CH₃) and 8.84 (triplet, J 7Hz; CH₃).

EXAMPLE 4

N-Alkyl derivatives of 1(R),5(R)-3-benzyl-4,7-diaza-6-oxo-2-thiabicyclo[3,2,0]-hept-3-ene The following N-alkyl derivatives were prepared similarly (see Example 3) using the bases and solvents indicated:

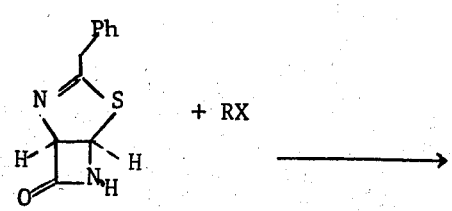

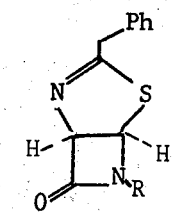

| R | BASE | SOLVENT | YIELD % | COMPOUND |
|---|---|---|---|---|
| EtOOCCH$_2$— | Na$_2$CO$_3$ | Acetone/Water | 43 | A |
| NO$_2$-C$_6$H$_4$-CH$_2$OOCCHBr(CH$_2$—) | Sodium Hexamethyl-disilizane | DMF | 38 | B |
| CH$_3$COCH$_2$— | NaH | DMF | 34 | C |
| PhCOCHCOOEt | (PhCH$_2$)Me$_3$NOH | DMF | 66 | D |
| (lactone) | NaH | DMF | 34 | E |
| —CH(COOEt)$_2$ | (PhCH$_2$)Me$_3$NOH | DMF | 42 | F |
| —CH(COOEt)(COOCHPh$_2$) | (PhCH$_2$)Me$_3$NOH | DMF | 78 | G |
| —CH(COOCMe$_3$)$_2$ | (PhCH$_2$)Me$_3$NOH | DMF | 65 | H |
| —CH$_2$—CH=CH$_2$ | (PhCH$_2$)Me$_3$NOH | DMF | 60 | I |

COMPOUND A

Ethyl (1R,5R)-α-[3-Benzyl-4,7-diaza-6-oxo-2-thia-bicyclo[3,2,0]-hept-3-en-7-yl]-acetate Gum, $\nu_{max}$ (CHBr$_3$) 1770 (β-lactam), 1740 (ester), and 1610 cm.$^{-1}$ (C=N), τ (CDCl$_3$) 2.68 (singlet; phenyl protons), 3.94 (doublet, J 4 Hz, C—5H), 4.22 (doublet, J 4 Hz, C—1H), 5.79 (quartet, J 7 Hz, —CH$_2$CH$_3$), 5.74 and 6.30 (two doublets, branches of a quartet, J 18 Hz, —CH$_2$—COO—), 5.99 and 6.20 (two doublets, branches of a quartet, J 15 Hz, Ph—CH$_2$—) and 8.72 (triplet, J 7 Hz, —CH$_2$—CH$_3$).

COMPOUND B p-Nitrobenzyl (1R,5R)-3'[3-Benzyl-4,7-diaza-6-oxo-2-thiabicyclo[3,2,0]-hept-3-en-7-yl]-2'-bromopropionate Gum, $\nu_{max}$ (CHBr$_3$) 1770 (β-lactam), 1740 (ester), and 1536 and 1350 cm.$^{-1}$ (—NO$_2$), τ (CDCl$_3$) (mixture of diastereoisomers) 1.73 and 2.44 (two doublets, J 8 Hz, p—No$_2$—Ar—CH$_2$—), 2.70 (singlet; phenyl protons), 4.01 (doublets, J 4 Hz; C—5H), 4.35 and 4.44 (doublets, J 4 Hz, C—1H), 4.72 (singlets; p—NO$_2$—Ar—CH$_2$—), 5.48 (multiplet; —CHBr—), 5.8–6.3 (multiplet; —CH$_2$—CHBr—), and 6.12 and 6.15 (branches of a collapsed quartet; Ph—CH$_2$—).

COMPOUND C (1R,5R)-7-Acetonyl-3-benzyl-4,7-diaza-6-oxo-2-thiabicyclo[3,2,0]-hept-3-ene.

Gum, $\nu_{max}$ (CHBr$_3$) 1765 (β-lactam), 1720 (—COCH$_3$), and 1610 cm.$^{-1}$ (—C=N—), τ (CDCl$_3$) 2.68 (singlet; phenyl protons), 3.96 (doublet, J 4 Hz, C—5H), 4.24 (doublet, J 4 Hz, C—1H), 5.70 and 6.20 (two doublets, branches of a quartet, J 18 Hz, —CH$_2$—CO—), 6.14 (singlet; Ph—CH$_2$—), and 7.90 (singlet; COCH$_3$).

COMPOUND D

Ethyl (1R,5R)-(3-Benzyl-4,7-diaza-6-oxo-2-thiabicyclo[3,2,0]-hept-3-en-7-yl)-benzoyl acetate Gum, $\nu_{max}$ (CHBr$_3$) 3430 (enol OH), 1773 (β-lactam), 1750 (ester), 1694 (ketone) and 748 cm$^{-1}$ (phenyl), τ (CDCl$_3$) (mixture of diastereoisoners and enol form) 2.08 to 2.9 (aromatic protons); 3.8 to 4.1 (doublets, Js~4 Hz.; C—5H) 4.62 and 4.18 (doublets, J 4 Hz.; C—1H), 5.75 and 5.92 (quartets, J 7 Hz.; —CH$_2$CH$_3$), 6.0 (singlet;

—COCHCOOEt), 6.0–6.8 (3AB-quartets, J 15 Hz; —CH$_2$Ph) and 8.72, 8.76 and 8.89 (3 triplets, J 7 Hz.; —CH$_3$).

COMPOUND E

2(1R,5R)-(3'-Benzyl-4',7'-diaza-6'-oxo-2'-thiabicyclo-[3,2,0]-hept-3'-en-7'-yl)-butyro-4-lactone Solid, $\nu_{max}$ (CHBr$_3$) 3340 (NH),~1760 (β-lactam and lactone) and 750 cm$^{-1}$ (phenyl) τ (d$_6$—DMSO) 2.7 (singlet; phenyl protons), 3.9 (doublet, J 4 Hz.; C—5H), 4.21 (doublet, J 4 Hz.; C—5H), 4.21 (doublet, J 4 Hz.; C—1H), 5.21(triplet, J 10 Hz.; C—2H), 5.72 (complex multiplet; C—4H) 6.10 (singlet; —CH$_2$Ph) and 7.35 to 7.85 (complex multiplet; C—3H).

COMPOUND F 1,1-Diethyl-2-[(1'R,5'R)3'-benzyl-4',7'-diaza-6'-oxo-2'-thiabicyclo(3',2',0)-hept-3'-en-7-yl]malonate Gum, $\nu_{max}$ (bromoform), 1774 (β-lactam), 1745 (CO$_2$Et), 1615 (c=N), 755 cm$^{-1}$, (Ph), τ (CDCl$_3$), 2.72 (C$_6$H$_5$), 3.99 and 4.02 (AB-quartet, J 4.5 Hz, β-lactam protons), 4.96 (CH(CO$_2$R)$_2$), 5.6 to 6.0 (multiplet, CO$_2$CH$_2$CH$_3$), 6.03 and 6.23 (AB-quartet, J 15 Hz, PhCH$_2$), 8.72 to 8.79 (multiplet; CO$_2$CH$_2$CH$_3$).

COMPOUND G 1,1 Diphenylmethyl,ethyl-2-[(1′R,5′R)3′-benzyl-4′,7′-diaza-6′-oxo-2′-thiabicyclo(3′,2′,0)-hept-3′-en-7-yl]malonate Mixture of diastereoisomers, isolated as a gum, $\nu_{max}$ (CHBr$_3$), 1779 (β-lactam), 1752 (CO$_2$R) 754 and 740 cm$^{-1}$ (CHPh$_2$), τ (CDCl$_3$) 2.68 (PhCH$_2$ and CHPh$_2$), 3.08 (CHPh$_2$), 3.95 to 4.15 (multiplet, 1-H and 5-H), 4.81 (CH(CO$_2$R)(CO$_2$R′)5.7 to 60.0 (multiplet CH$_2$CH$_3$), 5.95 to 6.62 (multiplet, PhCH$_2$), 8.64 to 8.90 (multiplet, CH$_2$CH$_3$). Spectrum peaks were broadened owing to the presence of diastereoisomers.

COMPOUND H 1,1-Ditert-butyl-2[1′R,5′R)3′-benzyl-4′,7′-diaza-6′-oxo-2′-thiabicyclo(3′,2′,0)-hept-3′-en-7-yl] malonate Gum, $\nu_{max}$. (bromoform) 1770 (β-lactam), 1736 (CO$_2$R), 1612 cm$^{-1}$. (=N), τ (CDCl$_3$), 2.72 (PhCH$_2$), 4.01 and 4.08 (AB-quartet, J 4.5 Hz, 1-H and 5-H), 5.15 (CH(CO$_2$R)$_2$) 6.06 and 6.25 (AB-quartet, J 16 Hz, PhCH$_2$) 8.54 and 8.58 (two singlets, COOCMe$_3$).

COMPOUND I (1R,5R) 7-Allyl-3-benzyl-4,7-diaza-6-oxo-2-thiabicyclo-(3,2,0)-hept-3-ene Isolated as pale-yellow prisms, m.p. 49° to 51°, $[\alpha]_D^{25}$ −65° (c, 0.85%, tetrahydrofuran), $\nu_{max}$. (CHBr$_3$) 1762 (β-lactam), 1619 cm$^{-1}$ (C=N), τ (CDCl$_3$), 2.70 (singlet, C$_6$H$_5$), 4.02 (doublet, J 4 Hz, 5H), 4.28 (multiplet, —CH=CH$_2$) 4.53 (doublet, J 4 Hz, 1H), 4.79 and 4.81 (two doublets, J 10 Hz, and 14 Hz, =CH$_2$), 6.00 and 6.30 (AB-part of ABX-system, J$_{AB}$—13 Hz, J$_{AX}$ 6 Hz, J 4 Hz, — CH$_2$—CH=), and 6.14 (Ph—CH$_2$) (Found: C, 65.0; H, 5.4; N, 11.1; S, 12.4, C$_{14}$H$_{14}$N$_2$O requires C, 65.1; H, 5.5; N, 10.0; S, 12.4%).

EXAMPLE 5

Methyl 2-[1′R,5′R)-3′-benzyl-4′,7′-diaza-6′-oxo-2′-thiabicyclo[3′,2′,0′]-hept-3′-ene-7′-yl)-3-bromopropionate A solution of (1R,5R)-3-benzyl-4,7-diaza-6-oxo-2-thiabicyclo[3,2,0]-hept-3-ene (5 g., 24 m.mole) in acetone (200 ml.) was treated with anhydrous potassium carbonate (5 g.) and methyl 2,3-dibromopropionate (0.66 ml., 3 equivs.) at 22°. The reaction mixture was stirred for 6 hours. Methyl 2,3-dibromopropionate (0.42 ml. 2 equivs) was added and the reaction continued for a total of 48 hours. After filtration through kieselguhr the filtrate was evaporated to an oil which was chromatographed on silica (50 g.) with benzene:ethyl acetate = 3:1 as solvent. The title compound, R$_f$ 0.43 (starting material R$_f$ 0.35 in benzene:ethyl acetate = 1:1 was isolated as a mixture of isomers and as an oil (4.0 g, 43%), $\nu_{max}$ (CHBr$_3$) 3440 (NH), 1770 (β-lactam), 1840 (CO$_2$R), and 752 cm$^{-1}$ (phenyl), NMR CDCl$_3$, τ) 2.69 (phenyl), 4.01 and 4.06 (5-H multiplet J 4Hz), 4.35 and 4.43 (1-H, multiplet J 4Hz), 5.58 (multiplet, N—CH—CO$_2$—) 6.12 (—CH$_2$ phenyl 6.22 and 6.25 (OCH$_3$) and 6.1 and 6.4 (multiplet —CH$_2$Br).

EXAMPLE 6.

p-Nitrobenzyl-3-[(1′R,5′R)-3′-benzyl-4′,7′-diaza-6′-oxo-2′-thiabicyclo[3′,2′,0′]-hept-3′-ene-7′-yl)-2-bromopropionate A solution of (1R,5R)-3-benzyl-4,7-diaza-6-oxo-2-thiabicyclo[3,2,0]-hept-3-ene (1.9 g. 0.87 m.mole) and sodium hexamethyldisilazanyl (1.5 g. 1 equiv.) in N,N-dimethylformamide (15 ml.) was cooled to 10°. p-Nitrobenzyl 2,3-dibromopropionate (3.2 g. 1 equiv.) in N,N-dimethylformamide (4 ml.) was added quickly and the mixture stirred at 15° for 10 minutes. After pouring into water (150 ml.) and extracting with ethyl acetate (40 ml.), the organic phase was washed with water, dried, and evaporated to a gum. Chromatography on silica (40 g.) using benzene:ethyl acetate = 4:1 solvent gave the *Title compound* (0.75 g. 19%) as a foam (R$_f$ 0.61 in benzene-ethyl acetate = 1:1), $\nu_{max}$ (CHBr$_3$) 1770 (β-lactam), 1740 (—CO$_2$R), 1536 and 1350 cm$^{-1}$ (NO$_2$). NMR. (CDCl$_3$ τ).

1.8 and 2.5 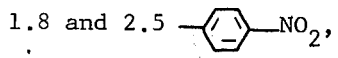

AB-quartet, J 9 Hz), (phenyl), 4.1 and 4.45 (5-H and 1-H respectively J 4Hz), 4.75 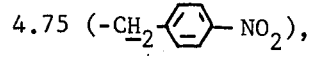

and 6.2 (—CH$_2$ phenyl).

EXAMPLE 7

Methyl 1-(1′R,5′R)-(3′-Benzyl-4′,7′-diaza-6′-oxo-2)-thiabicyclo-[3,2,0]-hept-3′-en-7′-yl)-cyclopropane-1-carboxylate (1R,5R)-3-Benzyl-4,7-diaza-6-oxo-2-thiabicyclo-[3,2,0]-hept-3-ene (1.96 g, 0.009 mole) was stirred with sodium hexamethyldisilazanate (1.64 g, 0.009 mole) in N,N-dimethylformamide (10 ml.) at 21° for 10 minutes. Methyl 2,4-dibromobutyrate (3 ml.) was added and after 30 minutes, the mixture was partitioned between water (250 ml) and ethylacetate (250 ml.). The aqueous layer, after separation, was extracted with ethyl acetate (2 × 100 ml.) and the combined ethyl acetate solutions were washed with water (2 × 100 ml.). After evaporation, the oil was chromatographed on silica gel in methylene chloride. Elution with 20% acetone in methylene chloride gave the *title compound* (0.84 g., 30%) as a gum $\nu_{max}$ (CHBr$_3$) 1765 (β-lactam) and 1772 cm$^{-1}$ (ester); τ (CDCl$_3$) 2.70 (singlet; phenyl protons), 4.07 (doublet, J 4 Hz.; C—5H), 4.26 (doublet, J 4 Hz.; C—1H), 6.14 (singlet; CH$_2$Ph), 6.33 (singlet; CH$_3$) and 8.3 to 8.8 (ABCD-system; cyclopropyl protons). (Found: C, 58.4; H, 5.0; N, 8.6; S, 9.5. C$_{16}$H$_{16}$N$_2$O$_3$S 0.5 H$_2$O (325) requires: C, 58.9; N, 5.2; N, 8.6; S, 9.8%).

EXAMPLE 8

Ethyl 2-(3′R,4′R)-[4′(2″-methylpropyldithio)-3′-phenylacetamidoazetidin-2-on-1-yl]-2-benzoylacetate To a stirred mixture of (3R,4R)-4(2′-methylpropyldithio)-3-phenylacetamidoazetidin-2-one (0.4 g., 0.0012 mole) and ethyl 2-benzoyl-2-bromoacetate (0.35 ml, 1 equiv) in chloroform (3 ml) and water (3 ml) was added tetra-N-butylammonium hydroxide (0.8 ml, 1 equiv). After 0.5 hours the reaction mixture was poured into water (50 ml) and extracted with chloroform (2 × 50 ml) The combined chloroform phases were washed with water (2 × 100 ml) and evaporated to a gum which was chromatographed on silica gel, with elution with 5% ethyl acetate in benzene, to yield ethyl 2-(3'R,4'R)-[4'(2''-methylpropyldithio)-3'-phenylacetamido azetidin-2-on-1-yl]-2-benzoylacetate (0.099 g., 16%) as gum (7:3 = keto:enol) $\nu_{max}$. (CHBr$_3$) 3411 (NH), 1764 ($\beta$-lactam), 1740 (ester), 1680 (ketone), and 1676 and 1505 cm$^{-1}$ (amide), $\tau$ (CDCl$_3$) keto form 2.02 and 2.44 (multiplets;

2.66 (singlet; PhC$\underline{H}_2$—), 4.26 (double doublet, J 5, 9 Hz.; 3 -H), 4.55 (doublet, J 5 Hz; 4-H), 5.70 (quartet, J 7 Hz.; —C$\underline{H}_2$—CH$_3$), 6.38, (singlet; PhC$\underline{H}_2$), 7.61 (doublet, J7 Hz.; S.CH$_2$) 8.29 (multiplet; CH$_2$.C$\underline{H}$(CH$_3$)$_2$), 8.69 (triplet, J7 Hz.; CH$_2$. CH$_3$), 9.10 (doublet, J6 Hz.; CH(C$\underline{H}_3$)$_2$) enol form 2.6 (singlet;

2.66 (obscured multiplet; PhC$\underline{H}_2$), 4.05 (singlet;

4.68 (double doublet; J 5, 7 Hz.; 3-H), 5.23 (obscured doublet; 4-H), 5.70 (quartet, J 7 Hz.; C$\underline{H}_2$CH$_3$), 6.40 (singlet; PhC$\underline{H}_2$), 7.46 (doublet, J 7 Hz.; S.C$\underline{H}_2$), 8.29 (multiplet; C$\underline{H}$(CH$_3$)$_2$), 8.71 (triplet, J 7 Hz.; CH$_2$C$\underline{H}_3$), 9.05 (doublet, J 6 Hz.; —CH(CH$_3$)$_2$).

EXAMPLE 9

Diethyl 2- (3'R,4'R)[4'-(2''-methylpropyl)dithi-3'-phenylacetamido-azetidin-2'-on-1'yl] malonate (3R,4R)4-(2'-Methylpropyl)dithio-3-phenylacetamidoazetidin-2-one(0.5g.,1.54mmole) was partitioned between ether (30ml.) and water (20 ml.) and ethyl bromomalonate (1.1g., 4.63mmole) and 40% aqueous tetra-n-butylammonium hydroxide, (5ml., 7.7mmole) were added successively. The mixture was vigorously shaken for a few minutes, until the solid dissolved, then the phases were separated and the aqueous phase extracted with ethyl acetate (1×25ml.). The combined organic phases were washed with water (3×25ml.), dried and evaporated under reduced pressure to give a brown gum. Chromatography of the gum on silica gel (10×2cm.) with benzene: ethyl acetate = 5:1 as solvent gave the title compound (0.1g., 13.5%) as a yellow gum, D$_{max}$ (bromoform) 3440(NH), 1786 ($\beta$-lactam), 1752 (CO$_2$R), 1688 and 1514 cm$^{-1}$ (CDNH), r(CDCl$_3$) 2.72 (C$_6$H$_5$), 3.69 (doublet J9Hz,NH), 4.38 (double doublet, J9Hz,J5Hz,3-H), 4.79 (doublet, J5Hz,4-H), 5.12 (C$\underline{H}$(CO$_2$R)$_2$), 5.66 to 5.94 (two superimposed quartets, C$\underline{H}_2$CH$_3$), 6.45 (PhC$\underline{H}_2$), 7.52 (doublet, J7Hz,C$\underline{H}$zCH(C$\underline{H}_3$)$_2$), 8.06 to 8.50 (multiplet, C$\underline{H}$(CH$_3$)$_2$), 8.79 (triplet, CH$_2$C$\underline{H}_3$) 9.10 and 9.18 (two singlets, CH(CH$_3$)$_2$).

EXAMPLE 10

Benzyl (3'R,4'R)-2-bromo-3(4'-n-butyldithio-3'-phenylacetamido-azetidin-2'-on-1'-yl) propionate To (3R,4R)-4-n-butyldithio-3-phenylacetamido azetidin-2-one (3g., 9.25 mmole) in acetone (75ml.) were added benzyl 2-bromo-acrylate (8.9g., 37 mmole) and potassium carbonate (3g.), and the mixture was stirred at 21° for 24 hours. After filtration through a pad of silica gel, the mixture was evaporated under reduced pressure to give a brown gum. Chromatography of the gum on silica gel (5×10cm.) with 9:1 benzene:ethyl acetate as solvent gave the title compound (2.3g., 44%) as a yellow gum, $\nu_{max}$ (CHBr$_3$) 3390 (NH), 1762 ($\beta$-lactam), 1722 and 1242 (—CO$_2$R), 1670 and 1500 cm$^{-1}$ (CONH).

EXAMPLE 11

Diethyl 2-[(1'R,5'R)-3'-Benzyl-4',7'-diaza-6'-oxo-2'-thia-4'-(2'',2'',2''-trichloroethoxycarbonyl)-bicyclo[3',2',0']-hept-7'-yl]-malonate A solution of (1R,5R)-3-benzyl-4,7-diaza-6-oxo-2-thia-4-(2',2',2'-trichloro-ethoxycarbonyl) tricyclo [3,2,0]-heptane (1.2g.,3.1mmole) in anhydrous N,N-dimethylformamide (15ml.) at 0° was treated with a 40% solution of N-benzyltrimethylammonium hydroxide (3.72ml. 1 equiv), followed by diethyl 2-bromomalonate (1.15g., 1.5equiv.). The reaction was allowed to proceed for 25 minutes and poured into excess water. Extration with ethyl acetate (80ml.), washing with water, drying, and evaporation gave out oil. The title compound(Rf 0.65; benzene:ethylacetate = 1:1) was isolated after chromatography on silica gel (15g.) using benzene initially, followed by benzene:ethylacetate = 4:1 as solvent, (1.1g., 68%). The oil was found to have the following characteristics: $\nu$max. (CHBr$_3$) 1778 ($\beta$-lactam) and 1740 cm$^{-1}$ (CO$_2$R), N—MR (CDCE$_3$, $\tau$) 2.74 (phenyl), 4.38 and 4.50 (1'-H and 8'-H, J4Hz), 4.63 (3-H, multiplet), 5.02 (C$\underline{H}$CO$_2$Et), 5.06 and 5.27 (AB-quarter J12Hz, C$\underline{H}_2$C9$_3$), 5.80 (OCH$_2$), 6.25 and 6.81 (multiplet C$\underline{H}_2$Ph), 8.76 and 8.84 (two methyl groups).

EXAMPLE 12

Ethyl (3R,4R)-(3-Phenylacetamido-4-phenacylthioazetidin-2-on-1-yl)-acetate (3R,4R)-3-Phenylacetamido-4-phenacylthioazetidin-2-one(0.354g., 0.001 mole) was stirred with ethyl bromoacetate (0.5ml.) in acetone (2ml.) containing potassium carbonate (0.7g.) for 16 hours at 19°. The mixture was evaporated to dryness and chromatographed on silica gel, eluting with benzene-ethylacetate mixtures to give the title compound (0.144g., 33%) as a crystalline solid, M.p. 110° to 125°, Vmax (CHBT$_3$) 3440(NH), 1766 ($\beta$-lactam), 1740 (ester), 1690 (ketone), and 1678 and 1510 cm$^{-1}$ (amide), $\tau$(DMSO-d$_6$), 0.98 (singlet; NH), 1.99 to 2.35 (multiplet; COPh), 2.70 (singlet; CH$_2$Ph), 4.66 (double doublet, J8,5H$_2$; C 3-H), 4.79 (doublet; J5H$_2$; C 4-H), 5.82 (complex; —SCH$_2$, N—C$\underline{H}_2$. —C$\underline{H}_2$CH$_3$), 6.46 (singlet; C$\underline{H}_2$Ph), and 8.76 (triplet; J 7H$_2$;—CH$_2$C$\underline{H}_3$).

The starting material used in Examples 1, 2, 8 and 9 above may be prepared as described in Example 4 of the copending application of Barton, Taylor, Underwood, Looker and Hewitt (Part 5) Ser. No. 167,848, filed July 30, 1971. That used in Example 10 may be prepared as described in Example 10 of the said copending application.

The starting material for Examples 3–7 may be prepared according to Example 1(c) of the copending application of Barton, Long, Looker, Wilson and Underwood Ser. No. 167,876, filed July 30, 1971.

The starting material used in Example 11 may be prepared as described in Example 10 of the copending application of Underwood and Long (Part 3) Ser. No. 167,874, filed 30, 1971, and that used in Example 12 may be prepared as described in Example 12 of the copending application of Barton, Sammes, Hewitt, Looker and Underwood (Part 6) Ser. No. 167,875, filed July 30, 1971 refiled as Divisional Application Ser. No. 389,671 and 389,663 on Aug. 20, 1973.

We claim:

1. A compound of the formula:

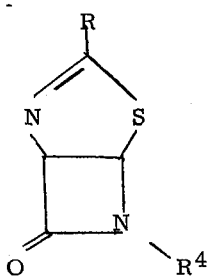

where R is phenyl, fluorophenyl, nitrophenyl, aminophenyl, phenoxymethyl, acetoxyphenyl, methoxyphenyl, methylphenyl, hydroxyphenyl, N,N-bis (2-chloroethyl)amino-phenyl, thien-2-yl, thien-3-yl, isoxazol-4-yl, pyridyl, tetrazolyl, 3-phenyl-5-methyl isoxazol-4-yl, or 3-chlorophenyl or 3-bromophenyl-5-methyl isoxazol-4-yl; $R^4$ is a benzyl, p-nitrobenzyl, diphenylmethyl, or alkyl of up to 4 carbon atoms ester of carboxymethyl, dicarboxymethyl, (bromo)(carboxy)ethyl or (benzoyl)(carboxy)methyl.

2. The compound of claim 1 wherein $R^4$ is (bromo)(carboxy) ethyl.

3. A compound as claimed in claim 1 in which R is a benzyl or phenoxymethyl group.

4. The compound of claim 1 which is Ethyl (1R,5R)-α-[3-Benzyl-4,7-diaza-6-oxo-2-thia-bicyclo[3,2,0]-hept-3-en-7-yl]-acetate.

5. The compound of claim 1 which is p-Nitrobenzyl, (1R,5R)-3'[3-Benzyl-4,7-diaza-6-oxo-2-thiabicyclo[3,2,0]-hept-3-en-7-yl]-2'-bromopropionate.

6. The compound of claim 1 which is 1,1-Diethyl-2-[(1'R,5'R)-3'-benzyl-4',7'-diaza-6'-oxo-2'-thiabicyclo(3',2',0)-hept-3'-en-7-yl]malonate.

7. The compound of claim 1 which is 1,1 Diphenylmethyl, ethyl-2-[(1'R,5'R)3'-benzyl-4',7'-diaza-6'-oxo-2'-thiabicyclo (3',2',0)-hept-3'-en-7-yl]malonate.

8. The compound of claim 1 which is 1,1-Ditertbutyl-2[1'R,5'R)3'-benzyl-4',7' -diaza-6'-oxo-2'-thiabicyclo (3',2',0)-hept-3'-en-7-yl]malonate.

9. The compound of claim 1 which is Methyl 2-[1'R,-5'R)-3'-benzyl-4',7'-diaza-6'-oxo-2'-thiabicyclo[3',-2',0']-hept-3'-ene-7'-yl)-3-bromo-propionate.

10. The compound of claim 1 which is p-Nitrobenzyl-3-[(1'R,5'R)-3'-benzyl-4',7'-diaza-6'-oxo-2'-thiabicyclo [3',2',0']-hept-3'-ene-7'-yl)-2-bromo-propionate.

11. The compound Diethyl 2-[(1''R,5'R)-3'-Benzyl-4',7'-diaza-6' oxo-2'-thia-4'-(2'',2'',2'''-trichloroethoxycarbonyl)-bicyclo[3',2',0']hept-7'-yl]-malonate.

* * * * *

UNITED STATES PATENT AND TRADEMARK OFFICE
CERTIFICATE OF CORRECTION

PATENT NO. : 3,927,013
DATED : December 16, 1975
INVENTOR(S) : DEREK HAROLD RICHARD BARTON et al.

It is certified that error appears in the above-identified patent and that said Letters Patent are hereby corrected as shown below:

IN THE CLAIMS:

Column 17, line 36, after "R" insert --is $R^u(O)_x C_n H_{2n}-$, where n is an integer from 1-4, X is 0 or 1 and $R^u$--;

Column 17, line 37, cancel "phenoxymethyl"

Signed and Sealed this

Sixth Day of December 1977

[SEAL]

Attest:

RUTH C. MASON
Attesting Officer

LUTRELLE F. PARKER
Acting Commissioner of Patents and Trademarks